(No Model.)

J. W. GRANGER.
PIANO DAMPER.

No. 446,097. Patented Feb. 10, 1891.

WITNESSES
Wm. A. Lowe
Wm. Wagner

INVENTOR
J. W. Granger
by his attorneys
Roeder & Briesen

UNITED STATES PATENT OFFICE.

JOHN W. GRANGER, OF NEW YORK, N. Y.

PIANO-DAMPER.

SPECIFICATION forming part of Letters Patent No. 446,097, dated February 10, 1891.

Application filed September 5, 1890. Serial No. 364,026. (No model.)

*To all whom it may concern:*

Be it known that I, JOHN W. GRANGER, of New York city, New York, have invented an Improved Damper for Pianos, of which the following is a specification.

This invention relates to an improved piano-damper, and more particularly to the construction of parts for connecting the damper-block to the stud or post.

The invention consists in the various features of improvement, more fully pointed out in the claims.

Figure 1:
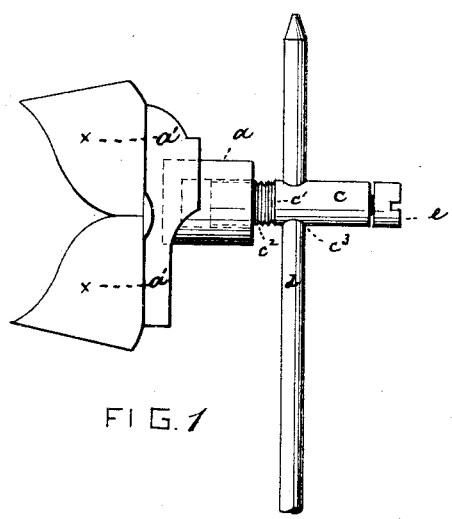
Figure 2:
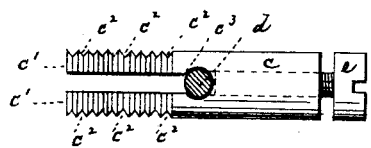
Figure 3:
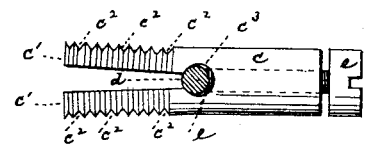

In the accompanying drawings, Figure 1 is a side elevation of my improved damper. Fig. 2 is a side view of the post with its jaws parallel and embracing the damper-wire. Fig. 3 is a similar view of the post with its jaws spread.

The letter $a$ represents the block of a piano-damper, to which is glued the felted head $a'$ at one end, and which is provided at its other end with a mortise for the reception of the stud $c$. The block $a$ may be made in two pieces, as shown, or in one piece. This stud is slotted or divided at one end to form two shanks $c'$, that are provided with a series of parallel surface grooves or corrugations $c^2$. Where the shanks $c'$ join the solid part of the stud $c$, the slot widens to form a communicating-perforation $c^3$ for the reception of the damper-wire $d$. Through the solid part of the stud there passes a set-screw $e$, adapted to bear upon such wire.

In attaching the stud $c$ to the block $a$ the shanks $c'$ are in their parallel position, Fig. 2, introduced into the socket of the block. Next the set-screw $e$ is turned to bear upon the wire $d$. The wire being thus forced outward will spread the shanks $c'$ apart at their free ends, Fig. 3, and thus firmly secure the stud to the block.

When it is at any time desired to change the inclination of the damper-head, it is only necessary to first turn the set-screw back, so as to release its pressure upon wire $d$, when the damper may be freely revolved.

The object of the grooves $c^2$ is to prevent any possibility of slipping. By forming a series of grooves the jaws may be inserted into the block to different depths, and thus the distance between the damper and the string may be readily adjusted.

What I claim is—

1. A piano-damper having a mortised block $a$ and a divided stud $c$ engaging such block, substantially as specified.

2. The combination of head $a'$ and mortised block $a$ with divided stud $c$, engaging said block, and with a set-screw $e$ within the stud, substantially as specified.

3. The combination of head $a'$ and mortised block $a$ with divided stud $c$, having perforation $c^3$, and with set-screw $e$, substantially as specified.

4. The combination of head $a'$ and mortised block $a$ with divided stud $c$, having a pair of corrugated shanks $c'$ and perforation $c^3$, and with set-screw $e$, substantially as specified.

JOHN W. GRANGER.

Witnesses:
F. V. BRIESEN,
A. JONGHMANS.